UNITED STATES PATENT OFFICE.

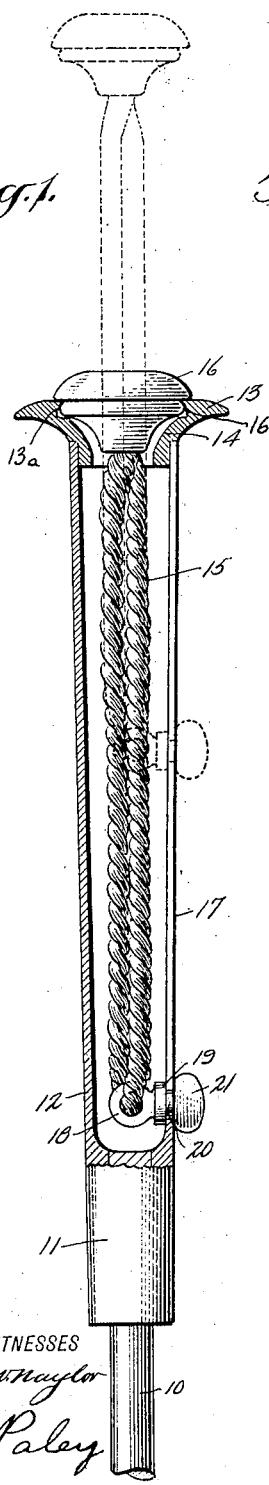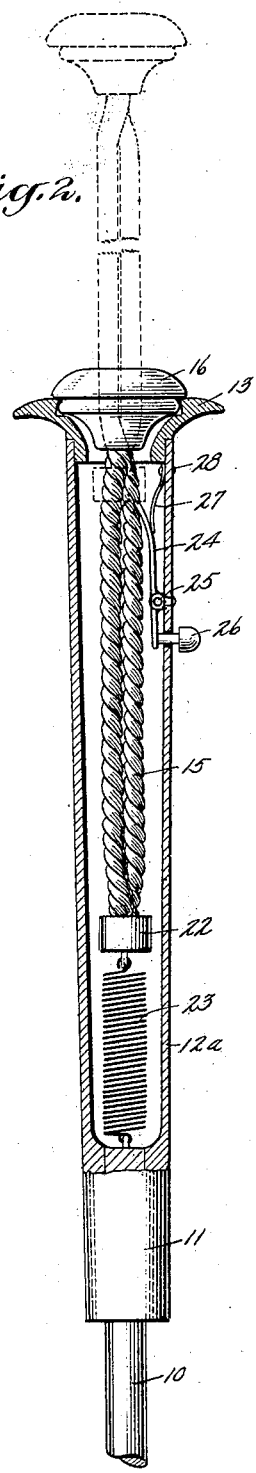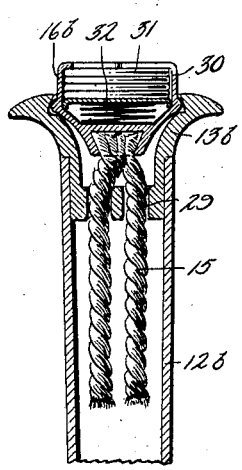

RALPH KAMENETZKY, OF BROOKLYN, NEW YORK.

UMBRELLA-HANDLE.

1,380,213.  Specification of Letters Patent.  Patented May 31, 1921.

Application filed March 16, 1920. Serial No. 366,232.

*To all whom it may concern:*

Be it known that I, RALPH KAMENETZKY, a citizen of the United States, and a resident of the city of New York, borough of Brooklyn, county of Kings, and State of New York, have invented a new and Improved Umbrella-Handle, of which the following is a full, clear, and exact description.

This invention relates to handles, and has reference more particularly to hollow handles provided with cords for the hand, said handles being adapted to be used on umbrellas, canes, fans, purses, and the like.

An object of this invention is to provide a handle which is hollow and contains a pair of cords, so that the hand may be slipped between the cords and the handle suspended thereby, or the cords may be placed in the handle out of sight when it is not desirable to use them.

Another object of this invention is to provide a coin purse on the knob which holds the cords so as to be convenient for immediate use.

Reference is to be had to the accompanying drawing forming a part of this specification, in which it is understood that the drawing illustrates only one form of the invention with certain modifications, and in which—

Figure 1 is an elevation of the handle with parts broken away to disclose the construction.

Fig. 2 is a view similar to Fig. 1 of a modified form of the handle.

Fig. 3 is a central sectional view through a second modified form of the handle showing a coin purse on the knob.

Referring to the accompanying drawing by numerals, 10 indicates the main rod of an umbrella, a cane, or the like, to which is secured the base 11 of a hollow tubular handle 12. A cap 13 is secured to the upper end of this handle, and said cap is provided with a centrally located tapering hole 14 through which extends a pair of cords 15. A knob 16 is provided with an annular bead $16_a$ which snaps into an annular oblique groove $13_a$ formed in the cap 13, and said knob is secured to one end of the pair of cords 15. A longitudinal slot 17 is provided in the tubular handle 12 and a ring 18 secured to the lower end of the cords 15 is provided with an annular shoulder 19 connected by a pin 20 to a button 21, the pin 20 being of such size as to slide in the slot 17, the shoulder 19 and the button 21 holding said pin in place in said slot. Thus when desirable the knob 16 may be pulled out of the cap 13 as shown in dotted lines in Fig. 1, so that the hand may be thrust between the cords and the handle suspended thereby. When it is desired to return the cords to the inside of the handle 12, the button 21 is pushed downwardly so that the knob at once returns to its normal position on the cap 13.

In the modification shown in Fig. 2, a disk 22 is provided on the lower end of the cords 15, and a coil spring 23 is connected to said disk 22 and to the inside bottom of the tubular handle $12_a$. A lever 24 is pivoted to the inside of the tubular handle $12_a$ by means of a pin 25, and a push button 26 is connected to one end of said lever extending to the outside of said tubular handle $12_a$ so as to be readily accessible. A spring 27 is secured to the inside of said handle by means of rivet 28, and said spring engages the end of the lever 24 opposite the push button 26 so that said lever is normally held in contact with the cords 15. When the knob 16 carrying the cords 15 is withdrawn from the cap 13, the disk 22 catches over the end of the lever 24, thus holding said disk in the position shown in dotted lines in Fig. 2 against the action of the spring 23. When it is desired to return the cords 15 to the hollow handle, the push button 26 is pressed which moves the lever 24 about its pivot 25, thus releasing the disk 22 from the end of said lever so that said cords 15 will be returned to the inside of the handle $12_a$ by means of the spring 23. In the modification shown in Fig. 3, the cap $13_b$ is provided with a pair of holes 29, and one of the cords 15 extends through each of said holes to the inside of the handle $12_b$. Any suitable coin purse 30 may be provided on the knob $16_b$ and the coins 31 of said purse may be held in position by means of a coil spring 32 inclosed in said purse. The lower end of the cords 15 in Fig. 3 may be attached to either of the devices shown in Fig. 1 or Fig. 2.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new and desire to secure by Letters Patent:

1. A device of the character described comprising a tubular member having an open end, a looped flexible member adapted to be carried within the tubular member and extended from the open end thereof, an operating knob carried by one end of said looped flexible member, resilient means secured at one of its ends to the looped flexible member and at its other end to the tubular member, said resilient means serving to maintain the looped flexible member within the tubular member, and a spring finger carried by the tubular member and adapted for engagement with the flexible looped member to maintain the same in extended position without the tubular member against the action of said resilient means.

2. A device of the character described comprising a tubular member having an open end, a looped flexible member adapted to be carried within the tubular member and extended from the open end thereof, an operating knob carried by one end of said looped flexible member, resilient means secured at one of its ends to the looped flexible member and at its other end to the tubular member, said resilient means serving to maintain the looped flexible member within the tubular member, and means carried by the tubular member and comprising a resilient pivoted lever, the free end of which is adapted for engagement with the flexible looped member to maintain the same in extended position without the tubular member.

RALPH KAMENETZKY.